(12) United States Patent (10) Patent No.: US 10,007,739 B1
Gundersen et al. (45) Date of Patent: Jun. 26, 2018

(54) ADDRESS DATABASE RECONCILIATION

(75) Inventors: Mark A. Gundersen, Manchester, CT (US); Michael A. DeGiule, Enfield, CT (US); Muhammad Al-Amin Niang, Windsor, CT (US)

(73) Assignee: Valassis Direct Mail, Inc., Windsor, CT (US)

( * ) Notice: Subject to any disclaimer, the term of this patent is extended or adjusted under 35 U.S.C. 154(b) by 980 days.

(21) Appl. No.: 11/825,155

(22) Filed: Jul. 3, 2007

(51) Int. Cl.
*G06F 7/00* (2006.01)
*G06F 17/30* (2006.01)
*G06F 17/00* (2006.01)

(52) U.S. Cl.
CPC .. *G06F 17/30985* (2013.01); *G06F 17/30979* (2013.01)

(58) Field of Classification Search
CPC .................... G06F 17/30979; G06F 17/30985
USPC .................. 707/200, 692, 999.001–999.005
See application file for complete search history.

(56) References Cited

U.S. PATENT DOCUMENTS

| | | | |
|---|---|---|---|
| 5,079,714 A | 1/1992 | Manduley et al. | |
| 5,303,149 A * | 4/1994 | Janigian | 707/999.006 |
| 5,452,203 A | 9/1995 | Moore | |
| 5,668,990 A | 9/1997 | Bajorinas et al. | |
| 5,724,597 A * | 3/1998 | Cuthbertson et al. | 707/E17.039 |
| 5,734,568 A | 3/1998 | Borgendale et al. | |
| 5,944,787 A | 8/1999 | Zoken | |
| 6,131,101 A | 10/2000 | Maitino et al. | |
| 6,253,219 B1 | 6/2001 | Gardner et al. | |
| 6,457,012 B1 | 9/2002 | Jatkowski | |
| 6,701,352 B1 | 3/2004 | Gardner | |
| 6,725,243 B2 | 4/2004 | Snapp | |
| 6,741,724 B1 | 5/2004 | Bruce et al. | |
| 6,783,063 B2 | 8/2004 | Holden | |
| 6,816,602 B2 | 11/2004 | Coffelt et al. | |
| 6,826,548 B2 | 11/2004 | Hungerpiller et al. | |
| 6,879,983 B2 | 4/2005 | Bellamy et al. | |
| 6,915,334 B1 * | 7/2005 | Hall | G06Q 10/107 370/352 |
| 6,985,926 B1 * | 1/2006 | Ferlauto | G06F 17/30303 707/999.006 |
| 7,031,959 B2 * | 4/2006 | Garner et al. | 707/999.003 |
| 7,127,458 B1 * | 10/2006 | Mantripragada et al. | 707/999.006 |
| 7,219,095 B1 * | 5/2007 | Bezuijen et al. | 707/688 |
| 7,974,882 B1 * | 7/2011 | Shada et al. | 705/24 |
| 2001/0054031 A1 * | 12/2001 | Lee et al. | 705/406 |

(Continued)

FOREIGN PATENT DOCUMENTS

| | | |
|---|---|---|
| JP | 11031192 | 2/1999 |
| JP | 11143867 | 5/1999 |

(Continued)

OTHER PUBLICATIONS

W. S. Wong and M. C. Chuah, A Hybrid Approach to Address Normalization. IEEE Expert 9(12) (1994) 38-45.*

(Continued)

*Primary Examiner* — Kannan Shanmugasundaram
(74) *Attorney, Agent, or Firm* — Fish & Richardson P.C.

(57) ABSTRACT

Methods for reconciling an address database include comparing addresses in an update database to addresses in a production database. A second comparison of unique addresses from the first comparison is executed, the second comparison allowing matching of addresses that the first comparison did not match.

44 Claims, 9 Drawing Sheets

(56) References Cited

U.S. PATENT DOCUMENTS

| | | |
|---|---|---|
| 2002/0078024 A1 | 6/2002 | Bellamy et al. |
| 2002/0111965 A1* | 8/2002 | Kutter ................ 707/6 |
| 2002/0133372 A1* | 9/2002 | Jakesch ............. 705/1 |
| 2002/0184064 A1 | 12/2002 | Schnurmann et al. |
| 2003/0074324 A1 | 4/2003 | Kresina et al. |
| 2003/0114956 A1 | 6/2003 | Cullen et al. |
| 2003/0172053 A1* | 9/2003 | Fairweather ............ 707/1 |
| 2003/0182018 A1* | 9/2003 | Snapp ................ 700/225 |
| 2003/0220920 A1* | 11/2003 | Lake et al. ............ 707/6 |
| 2003/0225725 A1 | 12/2003 | Miller et al. |
| 2004/0015493 A1* | 1/2004 | Garner et al. ............ 707/3 |
| 2004/0085580 A1 | 5/2004 | Kelleher et al. |
| 2004/0093222 A1* | 5/2004 | Sipe et al. ............ 705/1 |
| 2004/0172415 A1 | 9/2004 | Messina et al. |
| 2004/0220888 A1 | 11/2004 | O'Martin et al. |
| 2004/0225543 A1* | 11/2004 | Kapochunas et al. ............ 705/7 |
| 2004/0230565 A1 | 11/2004 | Burke |
| 2005/0021856 A1 | 1/2005 | Basile et al. |
| 2005/0047577 A1 | 3/2005 | Timmins |
| 2005/0049890 A1 | 3/2005 | Kan |
| 2005/0137991 A1* | 6/2005 | Bruce et al. ............ 705/410 |
| 2005/0197966 A1* | 9/2005 | Payne et al. ............ 705/62 |
| 2006/0276916 A1* | 12/2006 | Dearing et al. ............ 700/79 |

FOREIGN PATENT DOCUMENTS

| | | |
|---|---|---|
| JP | 11259488 | 9/1999 |
| JP | 2003/006420 | 1/2003 |
| JP | 2003/044494 | 2/2003 |
| JP | 2003/044656 | 2/2003 |
| JP | 2003/058607 | 2/2003 |
| JP | 2003/108946 | 4/2003 |
| JP | 2004/148238 | 5/2004 |

OTHER PUBLICATIONS

Mailing List Software, http://www.prntix.com/Mailing_Operations/Mailing_List_Software/mailing_list_software.html.
Hallogram Publishing, http://www.hallogram.com/mailers/.
USPS Address Management, http://www.usps.com/nationalpremieraccounts/manageprocessandaddress.htm.
Bulk Mailing Software, http://www.computorcompanion.com/LPMArticle.asp?ID=107.

* cited by examiner

FIG. 2

| Production Database 120 | Update Database 110 |
|---|---|
| 123 MAIN ST APT 5 | 123 MAIN ST APT 5 |
| 123 MAIN ST STE 5 | 123 MAIN ST #5 |

301 → (row 1 left), 302 → (row 1 right), 303 → (row 2 left), 304 → (row 2 right)

FIG. 5

| | 480 | 410 | 440 | 460 | 445 |
|---|---|---|---|---|---|
| Street Number | ● | ● | ● | ● | ● |
| Street Pre Directional | ● | ● | ● | ● | ● |
| Street Name | ● | ● | ● | ● | ● |
| Street Suffix | ● | ● | ● | ● | ● |
| Street Post Directional | ● | ● | ● | ● | ● |
| Secondary Unit Designator | | ● | | ● | |
| Secondary Unit Number | ● | ● | ● | ● | ● |
| Drop Stop Number | ● | ● | ● | ● | ● |
| Zip Code | ● | ● | ● | ● | ● |
| Locale | ● | ● | ● | ● | ● |
| Intradupe Check | | ● | | ● | |
| Business/Residential Comparison | ● | | | ● | ● |

FIG. 7

| | | 610 | 620 | 630 | 640 | 650 | 660 | 670 | 680 | 690 | 700 | 810 | 820 |
|---|---|---|---|---|---|---|---|---|---|---|---|---|---|
| 625 | Street Number | • | • | • | • | • | | | | • | • | • | • |
| 627 | Street Number (Cleansed) | | | | | | | • | | | | | |
| 629 | Street Pre Directional | • | • | • | • | • | • | • | • | • | • | • | • |
| 655 | Street Name | • | • | • | • | • | • | • | • | • | • | • | • |
| 657 | Street Suffix | • | • | • | • | • | • | • | • | • | • | • | • |
| 659 | Street Post Directional | • | • | • | • | • | • | • | • | • | • | • | • |
| 450 | Secondary Unit Designator | • | • | | • | • | • | | • | • | • | • | • |
| 455 | Secondary Unit Designator (Cleansed) | | | | | | | • | | | | | |
| 695 | Secondary Unit Number | • | • | • | • | • | | • | | • | • | • | • |
| 685 | Drop Stop Number | • | • | • | • | • | | | | • | • | • | • |
| 434 | PFN | • | • | • | • | • | • | • | • | • | • | | |
| 435 | Locale | • | • | • | • | • | • | • | • | • | • | • | • |
| 430 | Intradupe Check | • | • | • | • | • | • | • | • | • | • | • | • |
| 645 | Extended Match Logic | | • | • | • | • | • | • | • | • | • | • | • |
| 647 | Street Fuzzy Logic | | | | • | | | | | | | | |
| 665 | Secondary Unit/Drop Comparison | | | | | • | | | | | | | |
| 605 | Duplicate Balance Checking | | | | | • | | | | | | | |
| 615 | Street Number/Secondary Unit Number | | | | | | • | | | | | | |
| 617 | Cleansed Street Number/Secondary Unit Number | | | | | | | | • | | | | |
| 637 | Zip+4 Directory Lookup | | | | | | | | | • | | | |
| 638 | Reinstates | | | | | | | | | | • | | |
| 639 | 4-Digit Zip Code | | | | | | | | | | | • | |
| 641 | 3-Digit Zip Code | | | | | | | | | | | | • |

600

ADDRESS DATABASE RECONCILIATION

FIELD OF THE INVENTION

The application relates generally to database maintenance and, more particularly, to reconciling address records between related databases.

BACKGROUND

In some circumstances, it may be necessary to correct or update information in a first database by reference to a related but separate database. For example, a direct mail provider may need to update its production address database by reference to a second similar database containing corrections or updates. Maintaining (i.e., reconciling) a database, such as by identifying matching records between the first database and the second database, can be a difficult and time consuming process, particularly for large databases.

SUMMARY OF THE INVENTION

Embodiments of the present invention relate to a method for reconciling an address database comprising a first comparison of a plurality of addresses in an update database to a plurality of addresses in a production database; and a second comparison of a plurality of unique addresses from the first comparison, wherein the second comparison allows matching of addresses that the first comparison would not.

DESCRIPTION OF THE FIGURES

For the present invention to be understood clearly and readily practiced, the present invention will be described in conjunction with the following figures, wherein:

FIG. 2 is a chart that generally illustrates address records according to an embodiment of the present invention;

FIG. 5 is a chart that illustrates a series of ZIP-level matching schemes according to an embodiment of the present invention;

FIG. 7 is a chart that illustrates a series of Postal Finance Number-level matching schemes according to an embodiment of the present invention;

DESCRIPTION

In the following discussion of illustrative embodiments, the terms "address," "address record" and "address data" are used interchangeably to correspond to a delivery location. The terms "field" and "element" as used interchangeably to mean any component of an address record including, but not limited to, street number (e.g., "1234"), street pre directional (e.g., "W"), street name (e.g., "Main"), street suffix (e.g., "ST"), street post directional (e.g., "E"), secondary unit designator (e.g., "APT"), secondary unit number (e.g., "5A"), drop stop number, ZIP Code, and locale. The term "database," as used herein, may be any body of information that is logically organized so that it can be retrieved, stored and searched in a coherent manner including, but not limited to, separate tables within the same searchable storage entity. The terms "ZIP" and "ZIP Code" are used interchangeably throughout to refer the system of postal codes used by the United States Postal Service. In the context of address records, the terms "match," "matching," "compare," and "comparing" are used interchangeably throughout to refer broadly, without limitation, to a comparison of an address record to another address record by comparing at least some of their respective address fields (e.g., comparing street number to street number). The term "unique" refers to items not matched using certain match criteria.

It is to be understood that the figures and descriptions of the present invention have been simplified to illustrate elements that are relevant for a clear understanding of the present invention while eliminating, for purposes of clarity, other elements. For example, certain details relating to database architecture, process control, and scalability for processing large databases are not described herein. Those of ordinary skill in the art will recognize, however, that these and other elements may be desirable in a system for matching address records in a first database with address records in a second address database. A discussion of such elements is not provided because such elements are well known in the art and because they do not facilitate a better understanding of the present invention. Wherever possible, the same reference numbers will be used throughout the drawings to refer to the same or like parts.

Figure 1:
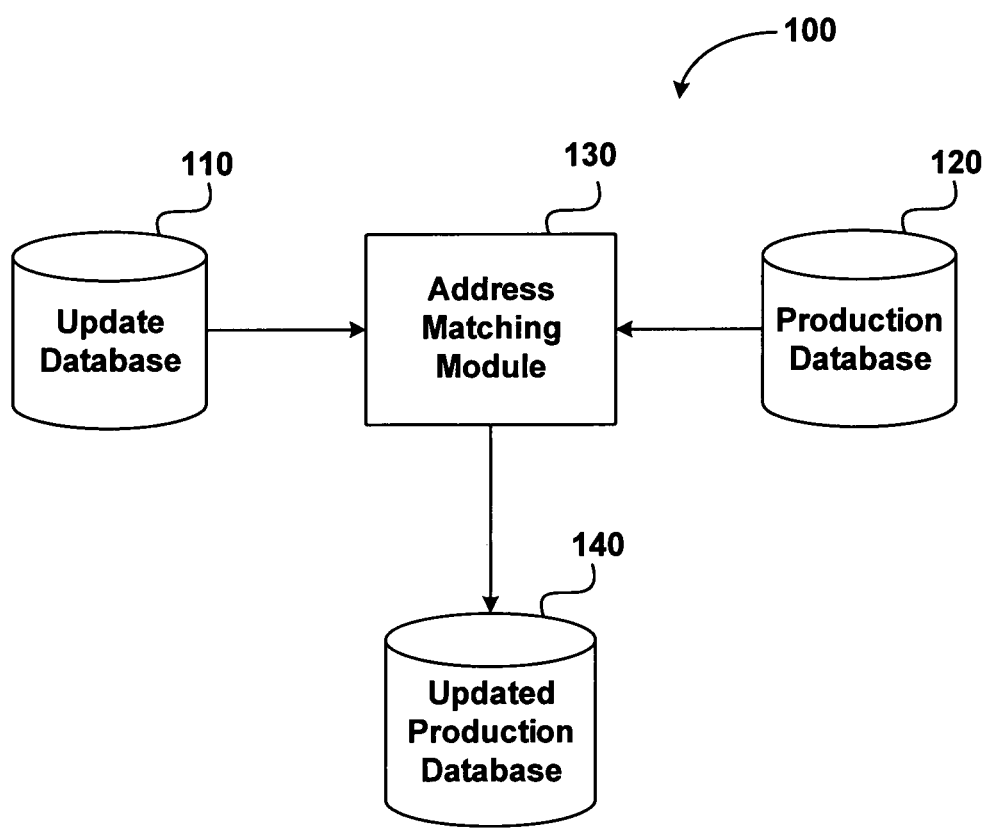
FIG. 1 is a schematic block diagram illustrating a system for matching address data in a first database with address data in a second address database according to an embodiment of the present invention.

FIG. 1 is a schematic diagram of a system 100 for matching address records in a first database with address records in a second address database according to an embodiment of the present invention. System 100 includes an update database 110, a production database 120, an address matching module 130, and an updated production database 140. Address matching module 130 is operably connected to and takes input from update database 110 and production database 120. Address matching module 130 is also operatively connected to and directs output to updated production database 140. Those skilled in the art will appreciate that system 100 is merely exemplary, and any number of other configurations are possible that will also adequately accomplish the principles of the present invention.

Update database 110 may be any information product that includes updated address information for an existing address list. Update database 110 may include, for example, new addresses, new or split ZIP Codes, or reformulated addresses in effect at a given point in time. An example of a reformulated address may be a changed street suffix, such as from "St." to "Rd." Update database 110, according to an embodiment, not only contains address records where there have been changes to addresses but also address records where there have been no changes to addresses. Update database 110 may also include addresses marked as "delete" to indicate that the address should be removed from production database 120. In some embodiments, the absence of an address from update database 110 can indicate the address should be deleted from production database 120. According to an embodiment, update database 110 may be an electronic information product organized by 5-digit ZIP Code. Update database 110 may be implemented using, for example, a Computerized Delivery Sequence (CDS) file available from the U.S. Postal Service.

Production database 120 may be any information product that includes addresses to be updated. Production database 120 may be derived from, for example, subscriber lists, customers visiting a particular store or website, or county records. Those skilled in the art will appreciate that production database 120 may benefit from address standardization in order to receive, for example, a CDS file from the U.S. Postal Service.

Address matching module 130 may be any algorithm for reconciling address records in Update database 110 with address records in production database 120. According to an embodiment, module 130 employs multiple matching algorithms that generally follow a "tight to loose" architecture, whereby progressively less restrictive match logic is used to identify matching address records. That is, the initial matching processes requires an almost exact match between address records in update database 110 and those in production database 120. Subsequent matching algorithms, which generally process only unmatched addresses (i.e., unique addresses), proceed with fewer restrictions, allowing an address from update database 110 to match an address in production database 120 that could not have occurred in the previous, more restrictive match logic. This architecture can remove an exact match from the process early so that an address is not improperly matched with a slightly different address when less restrictive match logic is applied later in the process. In some embodiments, address matching module 130 may be implemented using, for example, Match and Consolidate available from Business Objects, Inc. of San Jose, Calif., although in a non-traditional way.

Traditional uses of Business Objects software might include, for example, comparing a list of Company A's customers to a rented address list in order to remove Company A's customers from the rented list. In this way, matching addresses are removed from the desired list. Address matching module 130, however, is configured in a non-traditional way to combine address databases whereby matching is the objective and whereby a match of an address record from update database 110 with an address record in production database 120 is not considered a duplicate record.

According to an embodiment, address matching module 130 groups the matched address records according to the action to be taken, e.g., add, delete, update, or keep. Address records in the "add" group initially includes new addresses in update database 110 to be added to production database 120 and address records previously deleted from production database 120 that need to be reinstated. Reinstated address records within the "add" group may be identified by a comparison with a historical database using methods known to those skilled in the art. Address records in the "delete" group include addresses marked "delete" in update database 110 and, accordingly, should be deleted from production database 120. The "update" group may include address records from update database 110 in which one or more address elements have changed and, accordingly, should be updated in production database 120. The "keep" group may include those address records in update database 110 that match the corresponding address records in production database 120. The "keep" group addresses will not result in any change to production database 120.

Address matching module 120 may be configured to manage changes to production database 120 using logical flags so that historical address changes may be maintained for future use. For example, if an address record in production database 120 is missing from update database 110, the address record may be logically deleted, rather than permanently removed, from production database 120 such as by using a logical delete flag. This technique can be used in combination with the assignment of a unique identifier to each address in a database, as described in U.S. patent application Ser. No. 11/517,113, entitled "Address Database Coding," which is hereby incorporated by reference in its entirety.

To illustrate the effectiveness of the "tight to loose" architecture, FIG. 2 shows exemplary address records 301 and 303 in production database 120 and address records 302 and 304 in update database 110. If a single match process compares a street number 625, a street name 655, a street suffix 657, a secondary unit designator 450, and a secondary unit number 695, only one match will be found: address record 301 and address record 302. If, on the other hand, a single match process compares street number 625, street name 655, street suffix 657, secondary unit number 695, but not secondary unit designator 450, addresses 301, 302, 303, and 304 will all be considered part of a match group (i.e., more than one address from production database 120 or more than one address from update database 110).

To remedy this situation, an embodiment of the present invention may be configured to launch two match processes. Referring again to the exemplary address records shown in FIG. 2, the first match process compares street number 625, street name 655, street suffix 657, secondary unit designator 450, and secondary unit number 695 and finds one match: address record 301 and address record 302. The second match process applies to non-matches or "uniques" from the first match process (in this example, address record 303 and 304) and compares street number 625, street name 655, street suffix 657, secondary unit number 695, but not secondary unit designator 450. In this way, address record 301 and address record 302 will be matched in the first match process and, in the second match process, address record 303 and 304 will be picked up as an additional but separate group. The result is a valid "keep" address (address record 301) and an "update" address group (address record 303).

Figure 3:
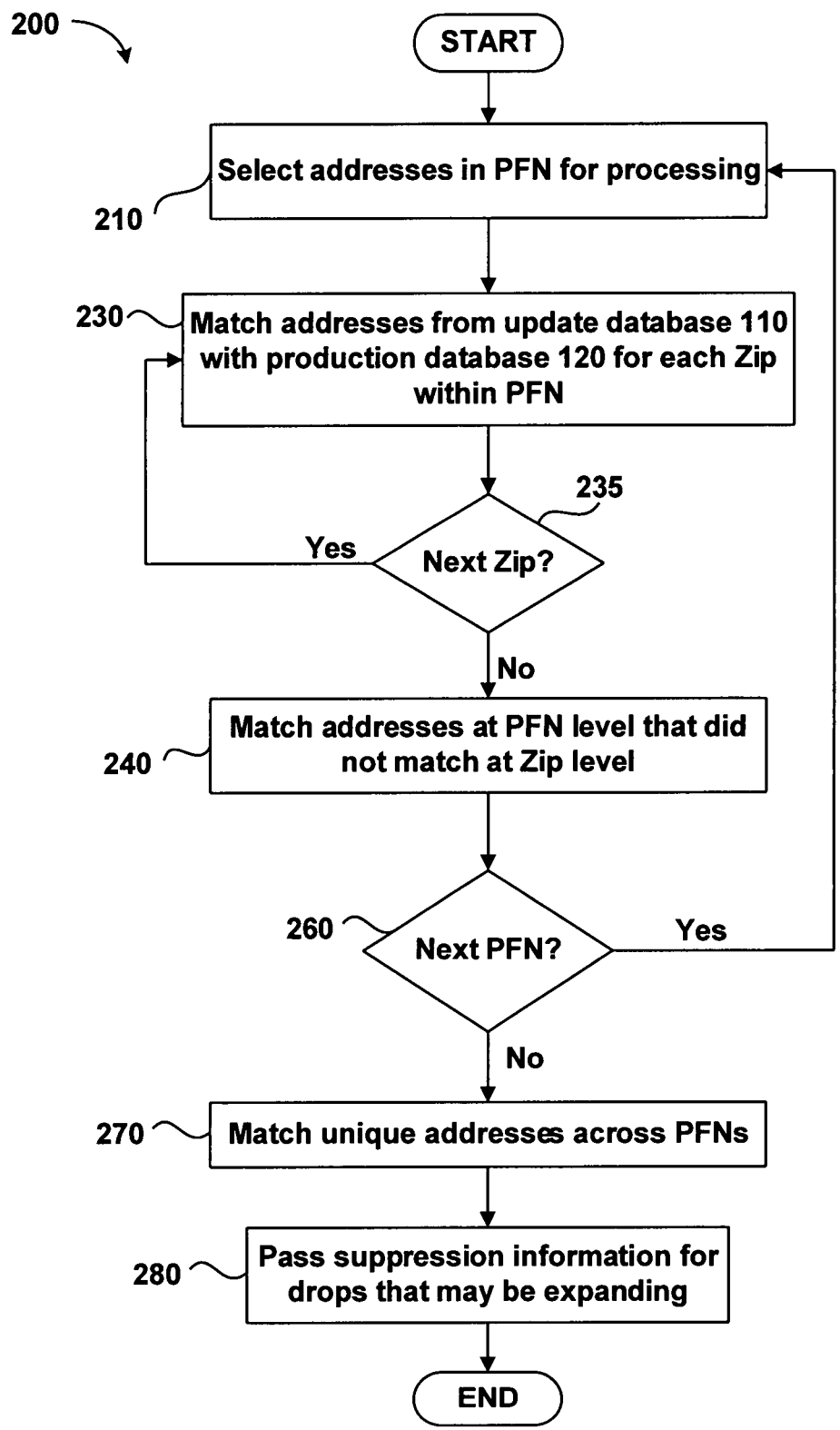
FIG. 3 is a process diagram that generally illustrates an embodiment of the present invention.

FIG. 3 shows an exemplary method 200 that may be carried out by matching module 130 according to an embodiment of the present invention. In step 210, module 130 searches update database 110 for a ZIP Code within a Postal Finance Number (PFN) to process. Those skilled in the art will appreciate that update database 110 may be arranged by PFN and that each PFN can include several ZIP Codes. Those skilled in the art will also appreciate that city name is an alternative method of grouping like postal geography together.

Collections of PFNs, that comprise ZIP Codes, may be processed in parallel to reduce overall processing time. In steps 230 and 235, module 130 then proceeds for a given PFN, ZIP-by-ZIP, and compares each address in update database 110 to production database 130 until the PFN is complete.

In step 240, module 130 repeats a similar matching process carried out in step 230 but at the PFN-level instead of the ZIP-level. According to an embodiment, only the addresses not matched in step 230 will be compared at the PFN-level. This PFN-level matching in step 240 may be useful, for example, to identify address movement within a PFN (i.e., where an address in a ZIP is reassigned from one ZIP to another ZIP). Once all processing for a PFN is complete, step 260 searches for another PFN in update database 110. According to an embodiment, method 200 continues until all the PFNs in update database 110 have been completed. PFN-level matching may be configured to compare addresses in production database 120 with addresses in update database 110 regardless of the business/residential indicator. The business/residential indicator may nevertheless be used for statistical purposes, such as to create a history of a given address as to whether the address changed its designation from business to residential or vice-versa.

According to an embodiment, step 230 may be broken down further to include two primary flows: street-type and box-type addresses. Those of ordinary skill will appreciate that street-type addresses are those with a carrier route number beginning with a "C," "H," or "R" and that box-type addresses have a route number beginning with "B." A matching algorithm for street-type addresses may be processed both at a ZIP and a PFN-level. Box-type address may only be compared at the ZIP-level because, as those skilled in the art will appreciate, Post Office Box movement among box-type routes is quite rare.

Figure 4:
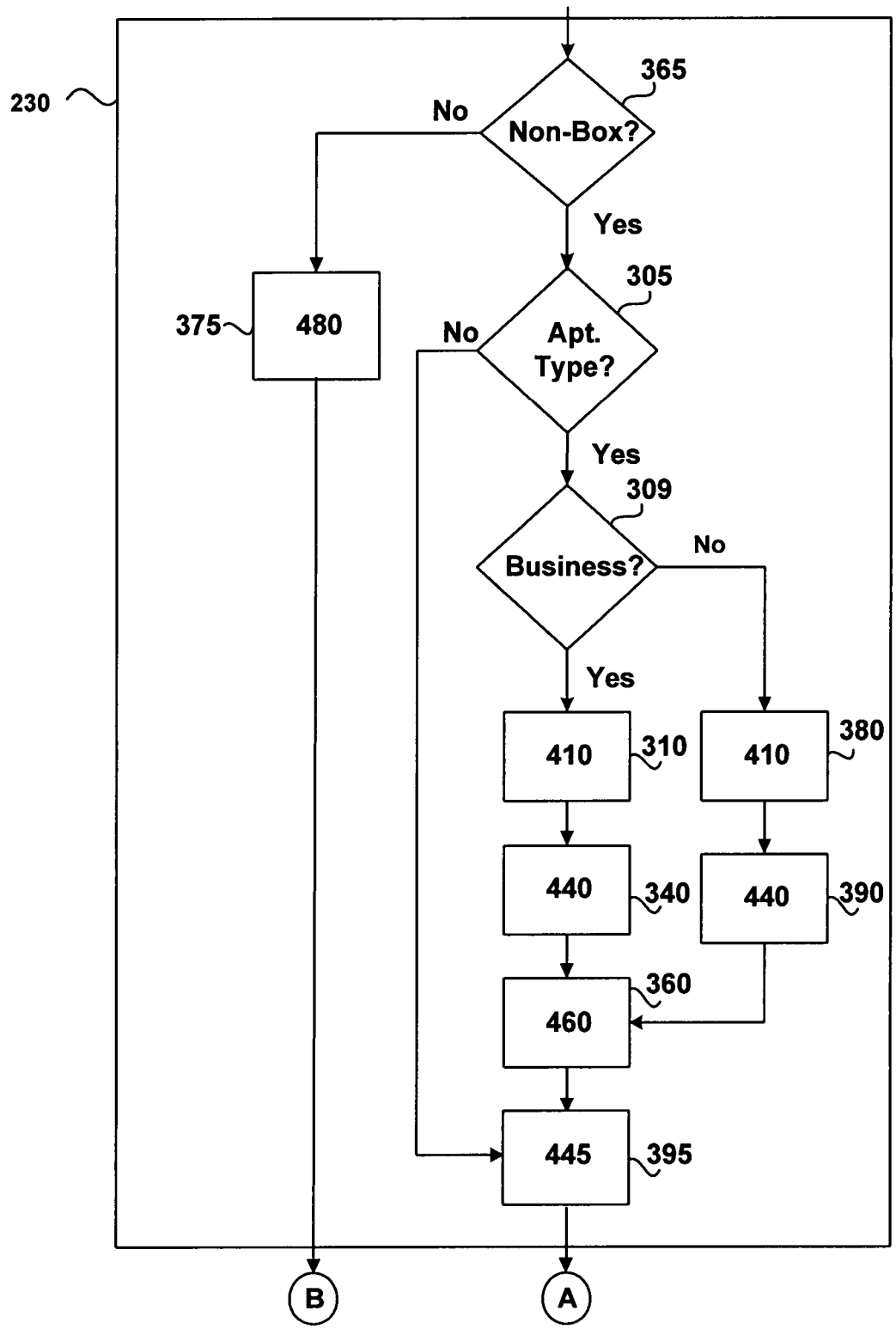
FIG. 4 is a process diagram that illustrates a ZIP-level match process according to an embodiment of the present invention.

FIG. 4 shows step 230 of exemplary method 200 in greater detail according to an embodiment of the present invention. Method 230 begins in step 365 by separating box-type and street-type addresses in update database 110. Among the two primary flows, street-type and box-type addresses, the street-type addresses can be broken down further into apartment-type and non-apartment type. This leaves three exclusive categories of address records. Thus, as used herein, the terms "non-apartment-type" and "box-type" are mutually exclusive because "non-apartment-type" is a subcategory of street-type addresses.

In step 375, box addresses in update database 110 are compared to production database 120 with a match scheme 480 shown in FIG. 5. As shown in FIG. 5, match scheme 480 compares a plurality of address elements 420 for a given address in update database 110 to the corresponding address elements in production database 120. Any box addresses that do not find a match in step 375 may be further processed in step 240 described below.

Apartment-type addresses are identified in step 305 and then, in step 309, split into separate data streams for business and residential addresses. In other embodiments, not illustrated, business and residential addresses may be processed in a single stream.

In step 310, street-type business addresses in update database 110 are compared to production database 120 in accordance with a match scheme 410 shown in FIG. 4. As illustrated, step 310 includes an intradupe check 430 that generally identifies addresses in update database 110 that match each other. According to an embodiment of intradupe check 430, if two or more addresses in update database 110 match each other according to match scheme 410, the matching addresses in update database 110 and the corresponding address in production database 120 will not be matched but, instead, will be passed on to step 340 or identified for manual processing.

In step 340, apartment-type, non-box business addresses not matched in step 310 are compared in accordance with a match scheme 440 shown in FIG. 4. Match scheme 440 is similar in many respects to match scheme 410 except that match scheme 440 does not include intradupe check 430 and does not compare secondary unit designator 450. For example, applying match scheme 440 to the exemplary address records shown in FIG. 3, address record 303 and address record 304 would match despite differences in secondary unit designator 450 because, in the illustrated embodiment, secondary unit designator 450 is excluded from match scheme 440.

FIG. 4 shows, in steps 380 and 390, apartment-type, non-box residential addresses are compared using match schemes 410 and 440, as described above in connection with unmatched business addresses. In step 360, method 230 combines the business and residential streams and then compares the remaining unique apartment-type business and residential addresses in accordance with a match scheme 460 shown in FIG. 5. According to the embodiment shown in FIG. 5, match scheme 460 is similar in many respects to match scheme 410 except that match scheme 460 allows comparisons between business and residential addresses 457. Match scheme 460 does not, however, allow comparisons between apartment and non-apartment addresses.

Method 230 continues in step 395 by comparing unique non-box addresses not matched in step 360 in accordance with a match scheme 440 shown in FIG. 5. Any remaining addresses that do not find a match in steps 310, 340, 360, 375, 380, 390, and 395 may be further processed in step 240 described below.

Figure 6:
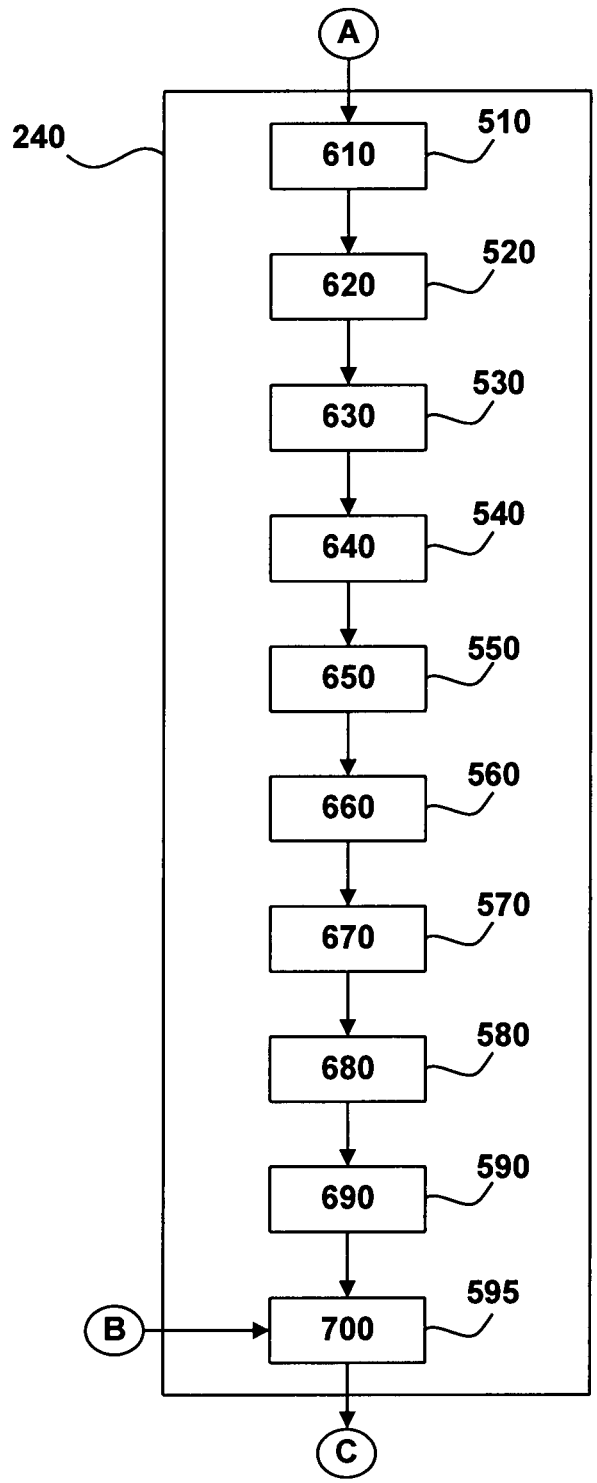
FIG. 6 is a process diagram that illustrates a Postal Finance Number-level match process according to an embodiment of the present invention.

FIG. 6 shows step 240 of exemplary method 200 in greater detail for matching addresses not matched at the ZIP-level in step 230. According to such an embodiment, method 240 begins in step 510 with a PFN-level comparison between remaining unmatched non-box addresses in accordance with a match scheme 610 shown in table 600 of FIG. 7.

In step 520, method 240 processes unmatched address records from step 510. Step 520 performs PFN-level match processing in accordance with a match scheme 620 shown in FIG. 7 between addresses in production database 120 and update database 110. Match scheme 620 is similar in many respects to match scheme 610 except that match scheme 620 includes, according to an embodiment, means for extended match logic such as Extended Match logic 645 available in Match and Consolidate from Business Objects, Inc. of San Jose, Calif. Match scheme 620 may be configured to allow inexact matches of address records, such as field cross-over matching where separate fields are compared. According to an embodiment, step 520 would allow matching of 1 Main REAR St. (where REAR is in the street name field) and 1 Main St. REAR (where REAR is in the secondary unit designator field).

In step 530, method 240 processes non-matches from step 520. Step 530 compares addresses in production database 120 and update database 110 in accordance with a match scheme 630 shown in FIG. 7. Match scheme 630 is similar in many respects to match scheme 620 except that secondary unit designator 450 is not used in comparisons.

In step 540, method 240 processes non-matches from step 530. Step 540 performs PFN-level match processing between addresses in production database 120 and update database 110 in accordance with a match scheme 640 shown in FIG. 7. Match scheme 640 is similar in many respects to match scheme 630 except match scheme 640 includes fuzzy logic to match street elements. For example, a fuzzy match is a match between an address in production database 120 and update database 110 where at least one of the following elements differ: street pre-directional 629, street name 655, street suffix 657, street post-directional 659, secondary unit designator 450, and secondary unit number 695.

In step 550, method 240 processes non-matches from step 540. Step 550 performs PFN-level match processing between addresses in production database 120 and update database 110 in accordance with a match scheme 650 shown in FIG. 7. Match scheme 650 is similar in many respects to match scheme 620 except that match scheme 650 includes a secondary unit/drop comparison 665 and a duplicate balance check 605.

Secondary unit/drop comparison 665 refers to a technique in which a drop stop number 685 is used in place of secondary unit number 695 if the address is part of a drop group. Drop stop 685 refers to a delivery point where a carrier may drop, for example, a bundle of advertising material. For example, update database 110 may include 123 MAIN ST DROP OF 10 while production database 120 may include 123 MAIN ST APT 1, 2, 3, 4, 5, 6, 7, 8, 9, 10. In step 550, 123 MAIN ST DROP OF 10 may be expanded to so that, for example, match scheme 650 would match 123 MAIN ST APT 2 with 123 MAIN ST DROP GROUP 1 DRP SEQ 2. Likewise, 123 MAIN ST APT 3 would match 123 MAIN ST DROP GROUP 1 DRP SEQ 3.

Duplicate balance check 605 ensures that all addresses within, for example, a street contain a one-to-one match. Street-level match balancing may be useful to identify generalized address changes in update database 110 that normally occur across all addresses within a broad range, like street name or street suffix. In this regard, match scheme 650 may include duplicate balancing check 605 to ensure that all addresses in production database 120 within, for example, a street have a corresponding match in update database 110. Matches between distinct address ranges, however, may be considered matches by duplicate balance check 605 only if there is a one-to-one match relationship within the range because a one-to-one match is a natural characteristic of, for example, a street suffix change.

In an embodiment, duplicate balance check 605 may be configured to prevent matching in the following unbalanced situation. Assume that production database 120 includes the following four addresses: 120 MAIN ST, 121 MAIN ST, 122 MAIN ST, 123 MAIN ST. Likewise, assume that update database 110 contains the following three addresses: 120 MAIN DR, 121 MAIN DR, and 122 MAIN DR. If a given match scheme does not include street suffix 657, all address in update database 110 would have a corresponding address in production database 120 but there would be one extra address from production database 120, namely 123 MAIN ST, that did not match an address in update database 110. In this example, step 560 would identify this situation and, in some embodiments, consider all seven addresses as non-matches because this scenario is not balanced.

In another example of duplicate balance check 605, update database 110 may include 4 MAIN ST DROP OF 4 while production database 120 may include 123 MAIN ST APT 1, 2, 3, 4, 5, 6. Unlike the previous example, the drop count does not match the number of apartments, in which case the above-described embodiment of duplicate balance check 405 would not match any of these addresses.

In step 560, method 240 processes non-matches from step 550. Step 560 performs PFN-level match processing between addresses in production database 120 and update database 110 in accordance with a match scheme 660 as shown in FIG. 7. Match scheme 660 is similar in many respects to match scheme 620 except that match scheme 660 considers two addresses a match if certain street name components match and a combination 615 of street number 625 and secondary unit number 695 also match. In an embodiment, the street name components in match scheme 660 include street pre-directional 629, street name 655, street suffix 657, street post directional 659, secondary unit designator 450, Zip Code 433, and locale 435. Combination 615 may be useful to match, for example, 202B MAIN ST with 202 MAIN ST, APT B.

In step 570, method 240 processes non-matches from step 560. Step 570 performs PFN-level match processing between addresses in production database 120 and update database 110 in accordance with a match scheme 670 as shown in FIG. 7. In the illustrated embodiment, match scheme 670 is similar in many respects to match scheme 620 except that match scheme 670 includes comparisons of cleansed street number 627 and cleansed secondary unit designator 455 instead of street number 625 and secondary unit designator 450. Match scheme 670 also differs from match scheme 620 in that drop stop number 685 is not included in the comparison.

Combination 615 of street number 625 and secondary unit number 695 may be constructed in various ways, including cleansing one or both of these fields before combination. Cleansing may involve removing special characters, such as dashes and slashes, and shifting alphabetic characters to the end of each field so that, for example, 123A MAIN ST will match A123 MAIN ST. Cleansing may also include converting alphabetic characters to numbers (e.g. A=1, B=2, C=3). For example, according to match scheme 670, 123A MAIN ST will match A123 MAIN ST. Likewise, 555 MAIN APT A will match 555 MAIN APT 1 and 789 ELM AVE 5 will match 789-5 ELM AVE. In an embodiment, match scheme 660 considers two addresses a match if the street name components match and one of the following conditions exist: (a) a combination of street number 625 and cleansed secondary unit number 695 match; or, the reverse, (b) a combination of cleansed street number 625 and secondary unit number 695 match.

In step 580, method 240 processes non-matches from step 570. Step 580 performs PFN-level match processing between addresses in production database 120 and update database 110 in accordance with a match scheme 680 as shown in FIG. 7. Match scheme 680 is similar in many respects to match scheme 660 except that match scheme 680 includes a combination 617 of street number 625 and secondary unit number 450 that may be constructed, according to an embodiment, by combining street number 625 and secondary unit number 450 into a single field and then by cleansing the combined field. Match scheme 680 may be used to match, for example, 123A MAIN ST STE 10 and 123 MAIN ST STE A10.

In step 590, method 240 processes non-matches from step 580. Step 590 performs PFN-level match processing between addresses in production database 120 and update database 110 in accordance with a match scheme 690 as shown in FIG. 7. Match scheme 690 is similar in many respects to match scheme 620 except that match scheme 690 includes a ZIP+4 directory lookup 637 to find address matches between street aliases and movements not identified in prior match steps. A ZIP movement occurs when the USPS realigns the ZIP code definitions so that, for example, 5 RIVER ST 06040 moves to 5 RIVER ST 06042. This is the same address but it is now in a different ZIP Code. In an example involving street aliases, match scheme 690 may be used to match 555 MLK BLVD to 555 INTERSTATE 75. ZIP+4 directory lookup 637 may be implemented, in part, using for example the ACE Library available from Business Objects, Inc. of San Jose, Calif. In some embodiments, a street name alias is an old or former street name.

In step 595, method 240 processes non-matches from step 590 and non-matches from the zip-level match process of step 375 illustrated in FIG. 4. Step 595 compares addresses in production database 120 marked as "delete" to update database 110 in accordance with a match scheme 700 as shown in FIG. 7. Match scheme 700 is similar in many respects to match scheme 620 except that match scheme 700 checks for box-type and non-box-type addresses marked as "delete" in production database 120 but that current update database 110 indicates should be reinstated (e.g., remove a logical delete flag).

Figure 8:
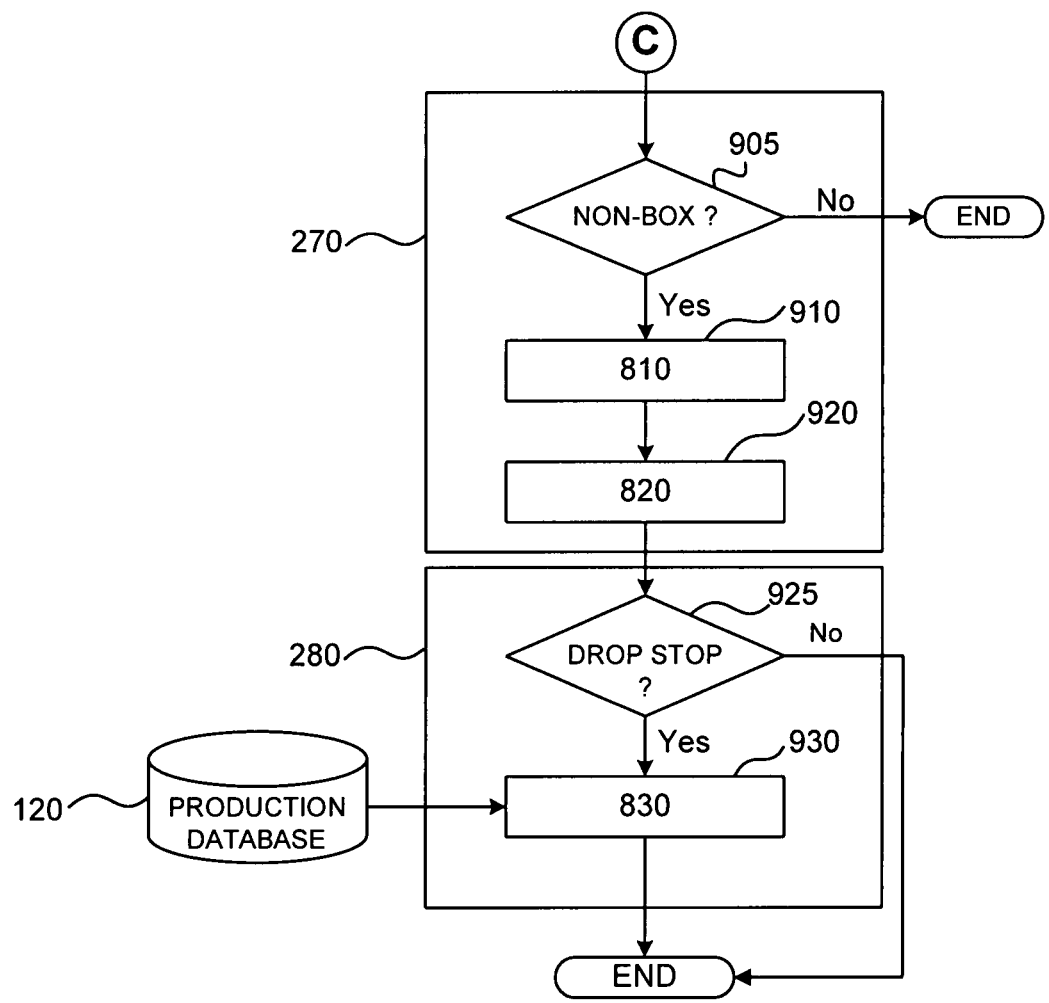
FIG. 8 is a process diagram that illustrates a series of Postal Finance Number-level matching schemes according to an embodiment of the present invention.

FIG. 8 shows step 270 of exemplary method 200 in greater detail for matching addresses not matched at the PFN-level in step 240. According to the illustrated embodiment, non-box addresses are identified in step 905. Step 910 compares unique non-box addresses from step 905 using a match scheme 810 shown in FIG. 7. Match scheme 810 is similar in many respects to match scheme 610 except that match scheme 810 allows matching between addresses that have different PFNs and that have different ZIP codes provided the first four digits of the ZIP codes match.

In step 920, method 270 processes non-matches from step 910. Step 920 compares addresses in production database 120 and update database 110 in accordance with a match scheme 820 shown in FIG. 7. Match scheme 820 is similar in many respects to match scheme 810 except that match scheme 820 allows matching if the first three digits of the ZIP codes match.

In step 925, unique non-box addresses with drop stops are identified and then, in step 930, compared to suppression codes with each drop group. A suppression code can be associated with a particular drop stop to indicate that items shall not be left at that drop stop. Suppression codes may be temporary, such as for an address at a college or university when classes are not in session. Suppression codes may be permanent if the drop stop is covered by a private carrier. In some embodiments, suppression codes, also known as DND (Do Not Deliver) codes, may be obtained from an information source separate from the source of the address updates. In such embodiments, suppression codes must be applied to update database 110. In some embodiments, suppression codes previously incorporated into production database 120 may be applied to update database 110. Step 930 may be configured to compare unique non-box addresses with drop stops in production database 120 with those in update database 110 according to match scheme 830 (not shown in FIG. 7). Match scheme 830 is similar in many respects to match scheme 610 except that match scheme 830 passes suppression delivery information for matching addresses with drop groups. For example, update database 110 may include 123 UNIVERSITY AVE DROP OF 10 while production database 120 may include 123 UNIVERSITY AVE DROP OF 5 DND. The quantity of items dropped at 123 University Ave. may have increased, for example, to reflect additional mailboxes. In an embodiment, step 930 updates 123 UNIVERSITY AVE DROP OF 5 DND to 123 UNIVERSITY AVE DROP OF 10 DND.

Figure 9:
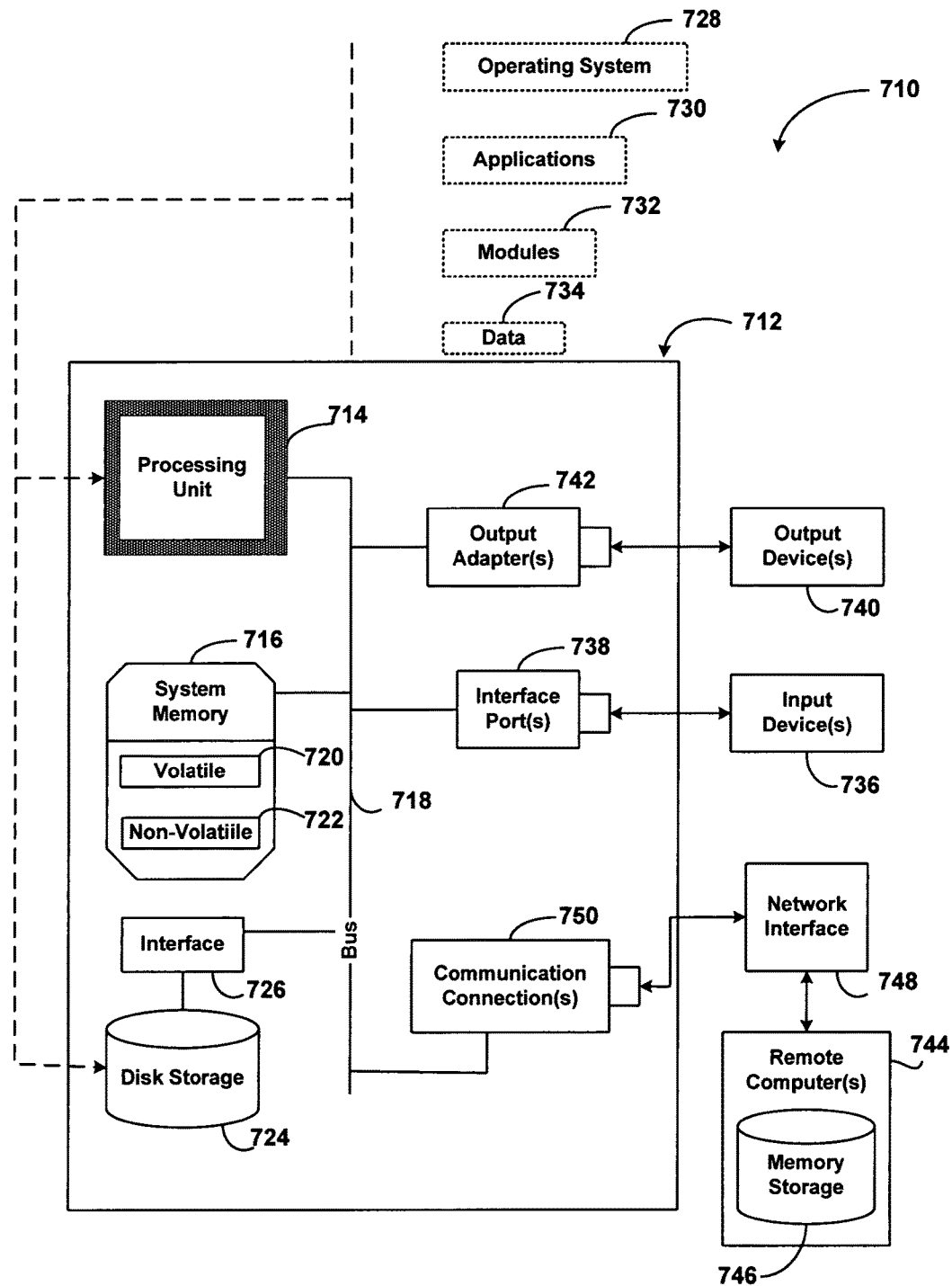
FIG. 9 is a schematic block diagram illustrating a suitable operating environment in accordance with an embodiment of the present invention.

In order to provide context for the various aspects of the invention, FIG. 9 and the following discussion is intended to provide a brief, general description of a suitable computing environment in which various aspects of the present invention may be implemented. For example, the operating infrastructure shown in FIG. 9 may be used to carry out the methods shown in FIG. 3, FIG. 4, FIG. 6 and FIG. 8 and apply the match schemes shown in FIG. 5 and FIG. 7.

While the invention will be described below in the general context of computer-executable instructions of a computer program that runs on a computer and/or computers, those skilled in the art will recognize that the invention also may be implemented in combination with other program modules. Generally, program modules include routines, programs, components, data structures, and other aspects that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices, microprocessor-based or programmable consumer electronics, and the like.

FIG. 9 is an exemplary environment 710 for implementing an embodiment of the present invention. Environment 710 includes a computer 712 that, in turn, includes a processing unit 714, a system memory 716, and a system bus 718. System bus 718 couples system components including, but not limited to, system memory 716 to processing unit 714. Processing unit 714 can be any of various available processors. Dual microprocessors and other multiprocessor architectures also can be employed as processing unit 714.

Computer 712 also includes removable/non-removable, volatile/non-volatile computer storage media. Disk storage 724 shown in FIG. 9 may be used, for example, to store the information referred to in FIG. 1. Disk storage 724 can be any available computer readable medium that can be accessed by a general purpose or special purpose computer. By way of example, and not limitation, such a computer readable medium can comprise RAM, ROM, electrically erasable programmable read only memory (EEPROM), CD-ROM or other optical disk storage, magnetic disk storage or other magnetic storage devices, or any other medium that can be used to store desired executable instructions or data fields and that can be accessed by a general purpose or a special purpose computer.

It is to be appreciated that FIG. 9 describes software that acts as an intermediary between users and the basic computer resources described in suitable operating environment 710. Such software includes an operating system 728. Operating system 728, which can be stored on disk storage 724, acts to control and allocate resources of the computer system 712. System applications 730 take advantage of the management of resources by operating system 728 through program modules 732 and program data 734 stored either in system memory 716 or on disk storage 724. Furthermore, it is to be appreciated that the present invention can be implemented with various operating systems, such as AIX UNIX available from IBM, or combinations of operating systems.

Those skilled in the art will appreciate, however, that the process described above, such as those illustrated in FIG. 3, FIG. 4, and FIG. 6 may be implemented at any level, ranging from hardware to application software and in any appropriate physical location. For example, the present invention may be implemented as software code to be executed by computer 712 using any suitable computer language and may be stored on any of the storage media described above, or can be configured into the logic of computer 712. Such software code may be executed by system 710 using any suitable computer language such as, for example, Java, Javascript, C++, C, C#, Perl, SQLPlus, SQL Loader, ProC, database languages, APIs, various system-level SDKs, assembly, firmware, microcode, and/or other languages and tools.

Computer 712 can operate in a networked environment using logical connections to one or more remote computers, such as remote computer(s) 744. The remote computer(s) 744 can be a personal computer, a server, a router, a network PC, a workstation, a microprocessor based appliance, a peer device or other common network node and the like, and typically includes many or all of the elements described relative to computer 712. For purposes of brevity, only a memory storage device 746 is illustrated with remote computer(s) 744. Remote computer(s) 744 is logically connected to computer 712 through a network interface 748 and then physically connected via communication connection 750. Network interface 748 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 750 refers to the hardware/software employed to connect the network interface 748 to the bus 718. While communication connection 750 is shown for illustrative clarity inside computer 712, it can also be external to computer 712. The hardware/software necessary for connection to the network interface 748 includes, for exemplary purposes only, internal and external technologies such as, modems including regular telephone grade modems, cable modems, DSL modems, power modems, ISDN adapters, and Ethernet cards. According to other embodiments, network interface 748 may capture data wirelessly through, for example, PCS, cellular, Bluetooth, 802.11, WiFi, Infrared, radio frequency, or other wireless technology.

These are representative components of an information processing system whose operation is well understood. Furthermore, those of ordinary skill in the art will appreciate that environment 710 of FIG. 9 is exemplary only and that the present invention can operate within a number of different computer systems including general-purpose computer systems, embedded computer systems, and stand-alone computer systems specially adapted for applications relating to data processing or a distributed computing network.

According to an embodiment, the architecture of the program that implements the matching system and method of the present invention may be configured to include three components: (i) an input component, ii) an analytical process component, and iii) an output component. According to an embodiment, the input component may include update database 110 operably connected to computer 712. The input component may further include, according to another embodiment, a graphical user interface "GUI" to visually represent the address records with which the user can visually review non-matched addresses.

According to an embodiment, the analytical process component may include processing steps that automatically identify certain address records and associate with those address records the processing resources that permit the computer system, such as computer system 712, to efficiently process the selected input sources. The output component may include output device 740 operably connected to computer 712. The output component, as in the input component, may also include a GUI that visually represents the status of the analytical function as the input is being processed. Those of ordinary skill in the art will appreciate that the visualization of the unmatched addresses provides significant feedback to the user for use in evaluating and resolving apparent mismatches. For example, a selected address record and the sets of suggested matching addresses may be displayed together on output device 740. This allows a user of computer 712 to easily compare the selected record to the set of suggested matches.

While the foregoing has been with reference to a few specific embodiments of the invention, it will be appreciated by those skilled in the art that changes in these embodiments may be made without departing from the principles and spirit of the invention, the scope of which is defined by the appended claims.

The invention claimed is:

1. A computer-implemented method for reconciling an address database comprising:
   automatically iterating through a set list of comparisons, the set list of comparisons including:
   a first comparison of a plurality of addresses in an update database to a plurality of addresses in a production database according to a first match logic identifying addresses in the production database and the update database that match, wherein the first match logic includes an intradupe check that identifies addresses in the update database that match each other and removes the identified matching addresses from the first comparison and comparing a ZIP Code in the update database to a ZIP Code in the production database; and
   a second comparison of a plurality of unique addresses remaining after the first comparison, the second comparison including a comparison of a plurality of unmatched addresses in the update database to a plurality of unmatched addresses in the production database and a comparison of the matching addresses identified by the intradupe check to the plurality of unmatched addresses in the production database according to a second match logic identifying addresses in the production database and the update database that match, wherein the second match logic is less restrictive than the first match logic using a Postal Finance Number (PFN) for the second comparison usable to group like postal geography together including several ZIP Codes to allow matching of addresses based on the PFN even if the ZIP Code in the update database differs from the ZIP Code in the production database; and
   updating the production addresses in the production database to be reconciled with addresses that are determined to have changed in the update database according to the matching update addresses identified by the set list of comparisons, wherein updating the production database includes using logical flags to cause a logical update action to be taken to preclude permanently changing the production database.

2. The computer-implemented method of claim 1 wherein, the first comparison includes comparing a plurality of apartment-type addresses in the update database to a plurality of apartment-type addresses in the production database, wherein the first comparison includes comparing a secondary unit designator; and
   the second comparison includes comparing a plurality of unique apartment-type addresses remaining from the first comparison, wherein the second comparison allows matching of addresses even if the secondary unit designator differs.

3. The computer-implemented method of claim 2, wherein the plurality of apartment-type address records includes a plurality of business addresses and a plurality of residential addresses, further comprising, separating the plurality of business addresses and the plurality of residential addresses into separate streams of business addresses and residential addresses before the first comparison.

4. The computer-implemented method of claim 2 wherein the plurality of addresses includes both business addresses and residential addresses, and wherein the second comparison includes comparing business addresses to residential addresses.

5. The computer-implemented method of claim 1 wherein the first comparison allows matching provided that one of the plurality of addresses in the production database matches not more than one of the plurality of addresses in the update database.

6. The computer-implemented method of claim 1 wherein the first comparison includes comparing a street name, and wherein the second comparison allows matching of address records that have inexact street names.

7. The computer-implemented method of claim 1 wherein the first comparison includes comparing a secondary unit number and a drop stop number, and wherein the second comparison allows matching of address records if the secondary unit number matches the drop stop number.

8. The computer-implemented method of claim 1 further comprising:
a third comparison between a plurality of box-type addresses in the update database to a plurality of box-type addresses in the production database, wherein the third comparison allows matching of addresses having different secondary unit designators.

9. The computer-implemented method of claim 1 wherein the second comparison includes allowing an inexact match.

10. The computer-implemented method of claim 9 wherein the inexact match includes removing special characters.

11. The computer-implemented method of claim 9 wherein the inexact match includes converting alphabetic characters to numbers.

12. The computer-implemented method of claim 9 wherein the inexact match includes rearranging alphanumeric characters.

13. The computer-implemented method of claim 1 wherein the first comparison includes comparing a drop stop number and an apartment number, and wherein the second comparison allows matching of address records if the drop stop number matches the apartment number.

14. The computer-implemented method of claim 1 further comprising,
a third comparison of a plurality of unique addresses remaining from the second comparison, wherein the third comparison allows matching of addresses even if the Zip Code differs and the Postal Finance Number differs.

15. The computer-implemented method of claim 1 wherein the plurality of addresses in the update database and the plurality of addresses in the production database include a plurality of common address fields including a first field and a second field, and wherein the second comparison includes comparing the first field to a combination of the first field and the second field.

16. The computer-implemented method of claim 15 wherein the first field is a street number and the second field is a secondary unit number.

17. The computer-implemented method of claim 1 wherein the plurality of addresses in the update database and the plurality of addresses in the production database include a plurality of common address fields including a first field and a second field, and wherein the second comparison includes comparing the first field to the second field.

18. The computer-implemented method of claim 17 wherein the first field is an expanded drop stop and the second field is a secondary unit number.

19. The computer-implemented method of claim 17 wherein the second comparison includes comparing a combination of the first field and the second field.

20. The computer-implemented method of claim 19 wherein the combination of the first field and the second field includes a street number and a secondary unit number.

21. The computer-implemented method of claim 20 wherein at least one of the street number or the secondary unit number is cleansed before comparing.

22. The computer-implemented method of claim 1 wherein the first comparison includes comparing a street name, and wherein the second comparison allows matching if the street name matches an alias of the street name.

23. The computer-implemented method of claim 1 wherein the first comparison includes comparing a ZIP Code, and wherein the second comparison allows matching if at least three digits of the Zip Code matches.

24. The computer-implemented method of claim 1 wherein one of the plurality of addresses in the production database includes a suppression code, and wherein the first comparison includes applying the suppression code to one of the plurality of addresses in the update database.

25. The computer-implemented method of claim 1 wherein one of the plurality of addresses in the production database includes a logical flag.

26. The computer-implemented method of claim 1 further comprising:
identifying a unique non-box address with drop stops from the second comparison,
wherein the unique non-box address with drop stops from the update database is associated with an updated suppression code; and
associating the unique non-box address with drop stops from the production database with the updated suppression code.

27. A system for reconciling an address database comprising:
an update database stored in a first memory device;
a production database stored in a second memory device; and
an address matching module in communication with the update database and the production database, the address matching module comprising a processor for automatically iterating through a set list of comparisons including a first comparison of a plurality of addresses in the update database to a plurality of addresses in the production database and a second comparison of a plurality of unmatched addresses remaining after the first comparison, the first comparison including a first match logic identifying addresses in the production database and the update database that match, and comparing a ZIP Code in the update database to a ZIP Code in the production database, the second comparison including a second match logic identifying addresses in the production database and the update database that match, wherein the first match logic includes an intradupe check that (i) identifies addresses in the update database that match each other, (ii) removes the identified matching addresses from the first comparison, and (iii) passes the identified matching addresses to the second comparison, the second match logic is less restrictive than the first match logic using a Postal Finance Number (PFN) for the second comparison usable to group like postal geography together including several Zip Codes to allow matching of addresses based on the PFN even if the Zip Code in the update database differs from the Zip Code in the production database, and updating the production addresses in the production database to be reconciled with addresses that are determined to have changed in the update database according to the matching update addresses identified by the set list of comparisons, wherein updating the production database includes using logical flags to cause a logical update action to be taken to preclude permanently changing the production database.

28. The system of claim 27 wherein,
the first comparison includes comparing a plurality of apartment-type addresses in the update database to a plurality of apartment-type addresses in the production database, wherein
the first comparison includes comparing a secondary unit designator; and
the second comparison includes comparing a plurality of unmatched apartment-type addresses from the first comparison, wherein the second comparison allows matching of addresses even if the secondary unit designator differs.

29. The system of claim 27 wherein the plurality of addresses in the update database and the plurality of addresses in the production database include a plurality of common address fields including a first field and a second field, and wherein the second comparison includes comparing the first field to the second field.

30. The system of claim 29 wherein the first field is an expanded drop stop and the second field is a secondary unit number.

31. The system of claim 27 wherein the plurality of addresses in the update database and the plurality of addresses in the production database include a plurality of common address fields including a first field and a second field, and wherein the second comparison includes the first field to a combination of the first field and the second field.

32. The system of claim 31 wherein the first field is a street number and the second field is a secondary unit number.

33. The system of claim 32 wherein the street number is a cleansed street number.

34. The system of claim 27 wherein the first memory device and the second memory device are the same device.

35. A system for reconciling an address database comprising:
an update database and a production database stored in memory, the update database and the production database each having a plurality of apartment-type addresses, wherein the plurality of apartment-type addresses include a plurality of address fields, and wherein the plurality of address fields includes a secondary unit designator; and
an address matching module in communication with the update database and the production database, the address matching module comprising a processor for automatically iterating through a set list of comparisons including a first comparison of the plurality of address fields in the update database to the plurality of address fields in the production database and a second comparison of a plurality of unmatched apartment-type addresses remaining after the first comparison, the first comparison including a first match logic identifying addresses in the production database and the update database that match and comparing a ZIP Code in the update database to a ZIP Code in the production database, the second comparison including a second match logic identifying addresses in the production database and the update database that match, wherein the first match logic includes an intradupe check that (i) identifies apartment-type addresses in the update database that match each other, (ii) removes the identified matching apartment-type addresses from the first comparison, and (iii) passes the identified matching addresses to the second comparison, the second comparison using a Postal Finance Number (PFN) usable to group like postal geography together including several Zip Codes to allow matching of addresses based on the PFN even if the Zip Code in the update database differs from the Zip Code in the production database, allows matching of the plurality of unmatched apartment-type addresses even if the secondary unit designator differs, and allows updating the production addresses in the production database to be reconciled with addresses that are determined to have changed in the update database according to the matching update addresses identified by the set list of comparisons, wherein updating the production database includes using logical flags to cause a logic update action to be taken to preclude permanently changing the production database.

36. A computer-implemented method for reconciling an address database comprising:
automatically iterating through a set list of comparisons including:
comparing, in a first comparison, a plurality of apartment-type addresses in an update database to a plurality of apartment-type addresses in a production database, wherein the first comparison includes an intradupe check that identifies apartment-type addresses in the update database that match each other and removes the identified matching apartment-type addresses from the first comparison and include comparing a ZIP Code in the update database to a ZIP Code in the production database;
comparing, in a second comparison, (i) a plurality of unmatched apartment-type addresses in the update database remaining from the first comparison to a plurality of unmatched apartment-type addresses in the production database remaining from the first comparison and (ii) the matching apartment-type addresses identified by the intradupe check to the plurality of unmatched apartment-type addresses in the production database, wherein the second comparison allows matching of addresses having different secondary unit designators and using a Postal Finance Number (PFN) for the second comparison usable to group like geography together including several Zip Codes to allow matching of addresses based on the PFN even if the ZIP Code in the update database differs from the Zip Code in the production database;
comparing, in a third comparison, a plurality of box-type addresses in the update database to a plurality of box-type addresses in the production database, wherein the third comparison allows matching of addresses having different secondary unit designators; and
comparing, in a fourth comparison, a plurality of unique apartment-type addresses remaining from the second comparison, wherein the fourth comparison allows matching provided the address record in the production database matches no more than one address record in the update database, wherein each comparison includes corresponding match logic identifying addresses in the production database and the update database that match, and updating the production addresses in the production database to be reconciled with addresses that are determined to have changed in the update database according to the matching update addresses identified by the set list of comparisons, wherein updating the production database includes using logical flags to cause a logical update action to be taken to preclude permanently changing the production database.

37. A non-transitory computer storage medium having stored thereon instructions causing a computer to perform steps comprising:

automatically iterating through a set list of comparisons, the set list of comparisons including:

a first comparison of a plurality of apartment-type addresses in an update database to a plurality of apartment-type addresses in a production database, wherein the first comparison includes comparing a secondary unit designator, and the first comparison includes an intradupe check that identifies apartment-type addresses in the update database that match each other and removes the identified matching apartment-type addresses from the first comparison and includes comparing a ZIP Code in the update database to a ZIP Code in the production database; and a second comparison of a plurality of unmatched apartment-type addresses remaining from the first comparison including a comparison of a plurality of unmatched apartment-type addresses in the update database to a plurality of unmatched apartment-type addresses in the production database and a comparison of the matching apartment-type addresses identified by the intradupe check to the plurality of unmatched apartment-type addresses in the production database, wherein the second comparison allows matching of addresses even if the secondary unit designator differ and using a Postal Finance Number (PFN) for the second comparison usable to group like postal geography together including several Zip Codes to allow matching of addresses based on the PFN even if the ZIP Code in the update database differs from the Zip Code in the production databases, wherein each comparison includes corresponding match logic identifying addresses in the production database and the update database that match, and updating the production addresses in the production database to be reconciled with addresses that are determined to have changed in the update database according to the matching update addresses identified by the set list of comparisons, wherein updating the production database includes using logical flags to cause a logical update action to be taken to preclude permanently changing the production database.

38. The medium of claim 37 wherein the instructions include XML-based process control language.

39. A system for reconciling an address database, the system comprising a computer readable medium that contains program instructions, and a processing unit that accesses and executes the program instructions, for:

automatically iterating through a set list of comparisons, the set list of comparisons including:

comparing, in a first comparison, a plurality of addresses in an update database on a first memory device to a plurality of addresses in a production database on a second memory device according to a first match logic identifying addresses in the production database and the update database that match, wherein the first match logic includes an intradupe check that identifies addresses in the update database that match each other and removes the identified matching addresses from the first comparison and includes comparing a ZIP Code in the update database to a ZIP Code in the production database; and comparing, in a second comparison, (i) a plurality of unmatched addresses remaining in the update database after the first comparison to a plurality of unmatched addresses remaining in the production database after the first comparison and (ii) the matching addresses identified by the intradupe check to the plurality of unmatched addresses remaining in the production database after the first comparison according to a second match logic identifying addresses in the production database and the update database that match, wherein the second match logic is less restrictive than the first match logic using a Postal Finance Number (PFN) for the second comparison usable to group like postal geography together including several ZIP Codes to allow matching of addresses based on the PFN even if the ZIP Code in the update database differs from the ZIP Code in the production database, and updating the production addresses in the production database to be reconciled with addresses that are determined to have changed in the update database according to the matching update addresses identified by the set list of comparisons, wherein updating the production database includes using logical flags to cause a logical update action to be taken to preclude permanently changing the production database.

40. The system of claim 39 wherein the first memory device and the second memory device are the same device.

41. A computer-implemented method of reconciling an address database comprising:

automatically iterating through a set list of comparisons, the set list of comparisons including:

a first comparison of a plurality of addresses in an update database to a plurality of addresses in a production database, wherein the first comparison includes comparing a Zip Code, and wherein the first comparison includes an intradupe check that identifies addresses in the update database that match each other and removes the identified matching addresses from the first comparison;

a second comparison including a comparison of a plurality of unmatched addresses remaining in the update database after the first comparison to a plurality of unmatched addresses remaining in the production database after the first comparison and a comparison of the matching addresses identified by the intradupe check to the plurality of unmatched addresses remaining in the production database after the first comparison, wherein the second comparison includes comparing a Postal Finance Number (PFN) usable to group like postal geography together including several ZIP Codes and allowing the matching of addresses based on the PFN even if the Zip Code differs; and a third comparison of a plurality of unmatched addresses remaining in the update database after the second comparison to a plurality of unmatched addresses remaining in the production database after the second comparison, wherein the third comparison allows matching of addresses even if the Zip Code differs and the Postal Finance Number differs, wherein each comparison includes corresponding match logic identifying addresses in the production database and the update database that match, and updating the production addresses in the production database to be reconciled with addresses that are determined to have changed in the update database according to the matching update addresses identified by the set list of comparisons, wherein updating the production database includes using logical flags to cause a logical update action to be taken to preclude permanently changing the production database.

42. A computer-implemented method of reconciling an address database comprising:

automatically iterating through a set list of comparisons, the set list of comparisons including:

a first comparison of a plurality of apartment-type addresses in an update database to a plurality of apartment-type addresses in a production database, wherein the first comparison includes an intradupe check that identifies apartment-type addresses in the update database that match each other and removes the identified matching apartment-type addresses from the first comparison and includes comparing a ZIP Code in the update database to a ZIP Code in the production database; and a second comparison including a comparison of a plurality of unmatched apartment-type addresses remaining in the update database after the first comparison to a plurality of street-type addresses remaining in the production database after the first comparison and a comparison of the matching apartment-type addresses identified by the intradupe check to the plurality of unmatched street-type addresses remaining in the production database after the first comparison, wherein the second comparison includes using a Postal Finance Number (PFN) to group likely postal geography together including several ZIP Codes to allow matching of addresses based on the PFN even if the ZIP Code in the update database differs from the ZIP Code in the production database, wherein each comparison includes corresponding match logic identifying addresses in the production database and the update database that match, and updating the production addresses in the production database to be reconciled with addresses that are determined to have changed in the update database according to the matching update addresses identified by the set list of comparisons, wherein updating the production database includes using logical flags to cause a logical update action to be taken to preclude permanently changing the production database.

43. The computer-implemented method of claim 42 wherein the first comparison includes comparing business addresses only to business address and residential addresses only to residential addresses.

44. A computer-implemented method of reconciling an address database comprising:

automatically iterating through a set list of comparisons, the set list of comparisons including:

a first comparison of a plurality of residential addresses only in an update database to a plurality of residential addresses only in a production database, wherein the first comparison includes an intradupe check that identifies residential addresses in the update database that match each other and removes the identified matching residential addresses from the first comparison and comparing a ZIP Code in the update database to a ZIP Code in the production database;

a second comparison of a plurality of business-type addresses only in the update database to a plurality of business-type addresses only in the production database; and a third comparison including a comparison of a plurality if unmatched residential addresses from the first comparison to a plurality of unmatched business-type addresses from the second comparison and a comparison of the matching residential addresses identified by the intradupe check to the plurality of unmatched business-type addresses from the second comparison and using a Postal Finance Number (PFN) for the comparison usable to group like postal geography together including several ZIP Codes to allow matching of addresses based on the PFN even if the ZIP Code in the update database differs from the ZIP Code in the production database, wherein each comparison includes corresponding match logic identifying addresses in the production database and the update database that match, and updating the production addresses in the production database to be reconciled with addresses that are determined to have changed in the update database according to the matching update addresses identified by the set list of comparisons, wherein updating the production database includes using logical flags to cause a logical update action to be taken to preclude permanently changing the production database.

\* \* \* \* \*